United States Patent
Kim et al.

(10) Patent No.: US 12,114,280 B2
(45) Date of Patent: Oct. 8, 2024

(54) METHOD AND APPARATUS FOR TIMING CONTROL IN WIRELESS COMMUNICATION SYSTEM

(71) Applicant: ELECTRONICS AND TELECOMMUNICATIONS RESEARCH INSTITUTE, Daejeon (KR)

(72) Inventors: Jung Bin Kim, Daejeon (KR); Pan Soo Kim, Daejeon (KR); Dong Hyun Jung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 34 days.

(21) Appl. No.: 17/408,830

(22) Filed: Aug. 23, 2021

(65) Prior Publication Data
US 2022/0061009 A1 Feb. 24, 2022

(30) Foreign Application Priority Data

Aug. 24, 2020 (KR) .................. 10-2020-0106150
Aug. 20, 2021 (KR) .................. 10-2021-0110401

(51) Int. Cl.
*H04W 56/00* (2009.01)
*H04W 74/0833* (2024.01)

(52) U.S. Cl.
CPC ..... *H04W 56/0045* (2013.01); *H04W 56/001* (2013.01); *H04W 74/0841* (2013.01)

(58) Field of Classification Search
CPC ........... H04W 56/0045; H04W 56/001; H04W 74/0841; H04W 74/0833
See application file for complete search history.

(56) References Cited

U.S. PATENT DOCUMENTS 9,801,019 B2    10/2017    Nallampatti Ekambaram et al.
9,814,006 B2    11/2017    Bae et al.
(Continued)

FOREIGN PATENT DOCUMENTS

KR    10-2017-0128324 A    11/2017
KR    20190017707 A    2/2019
(Continued)

OTHER PUBLICATIONS

3GPP, "3rd Generation Partnership Project; Technical Specification Group Radio Access Network; Solutions for NR to support non-terrestrial networks (NTN) (Release 16)", 3GPP TR 38.821 V16.0.0 (Dec. 2019).

*Primary Examiner* — Gary Mui
*Assistant Examiner* — Yewon Kim
(74) *Attorney, Agent, or Firm* — LRK PATENT LAW FIRM

(57) ABSTRACT

A timing control method performed by a terminal included in a communication network may include: configuring an initial timing reference based on time information obtained from the communication network; receiving a first downlink (DL) signal from a base station; based on the initial timing reference and the first DL signal, obtaining first transmission time information that is information on a timing when the first DL signal is transmitted by the base station and first reception time information that is information on a timing when the first DL signal is received by the terminal; determining a first timing advance (TA) value based on comparison between the first reception time information and the first transmission time information; and adjusting an uplink (UL) transmission timing for the base station based on the first TA value.

12 Claims, 8 Drawing Sheets

(56) References Cited

U.S. PATENT DOCUMENTS

| | | | |
|---|---|---|---|
| 9,832,800 B2 | 11/2017 | Shin et al. | |
| 10,638,442 B2 | 4/2020 | Kim et al. | |
| 10,856,257 B2 | 12/2020 | Lee et al. | |
| 2016/0150492 A1* | 5/2016 | Wang | H04W 56/0065 370/336 |
| 2016/0242132 A1* | 8/2016 | Bae | H04W 56/0005 |
| 2016/0309507 A1 | 10/2016 | Park et al. | |
| 2017/0302359 A1* | 10/2017 | Guo | H04W 92/12 |
| 2018/0167936 A1* | 6/2018 | Quan | H04W 72/0446 |
| 2018/0242268 A1* | 8/2018 | Rune | H04W 56/0015 |
| 2018/0343633 A1* | 11/2018 | Uchino | H04L 5/0055 |
| 2020/0107283 A1 | 4/2020 | Ratasuk et al. | |
| 2020/0128539 A1* | 4/2020 | Abedini | H04W 72/23 |
| 2020/0221410 A1* | 7/2020 | Kim | H04L 27/26025 |
| 2020/0252895 A1* | 8/2020 | Yi | H04W 72/0446 |
| 2021/0058884 A1* | 2/2021 | Liu | H04W 56/0045 |
| 2022/0030638 A1* | 1/2022 | Hosseinian | H04W 56/0045 |
| 2022/0046565 A1* | 2/2022 | Prakash | H04W 56/001 |
| 2022/0104281 A1* | 3/2022 | Xu | H04W 74/002 |
| 2022/0150858 A1* | 5/2022 | Ren | H04W 74/0833 |
| 2023/0010343 A1* | 1/2023 | Li | H04B 7/18513 |

FOREIGN PATENT DOCUMENTS

| | | |
|---|---|---|
| KR | 10-2020-0120104 A | 10/2020 |
| WO | 2019/195457 A1 | 10/2019 |
| WO | 2020/146506 A2 | 7/2020 |

\* cited by examiner

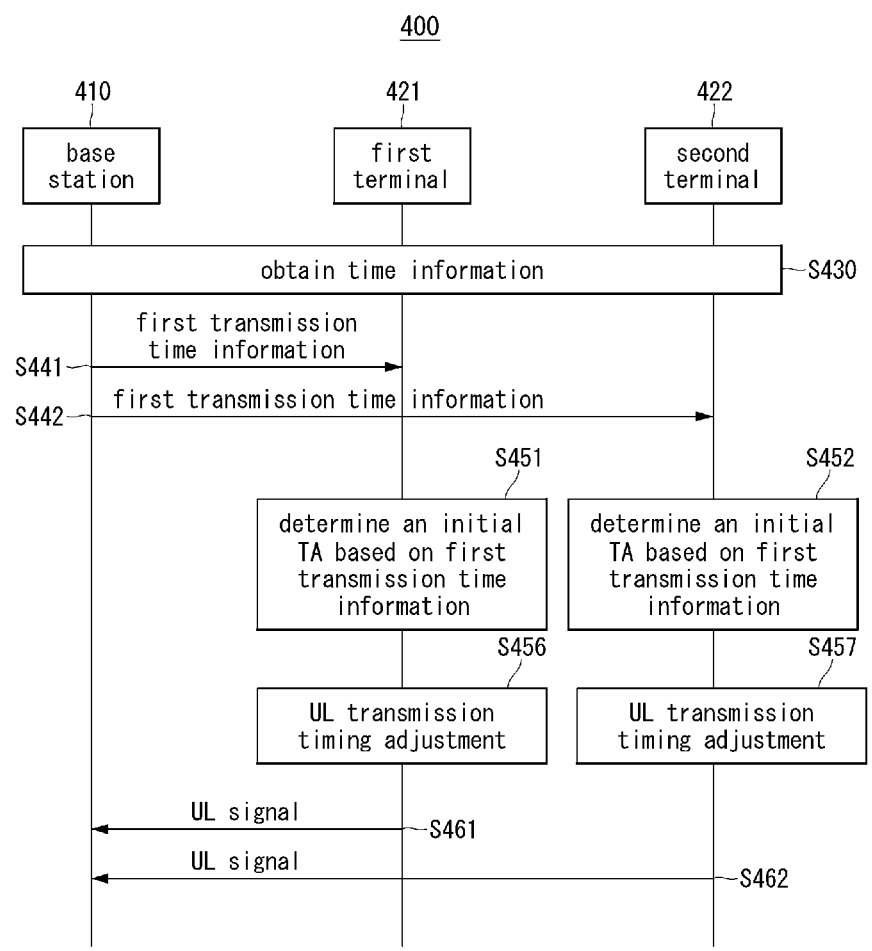

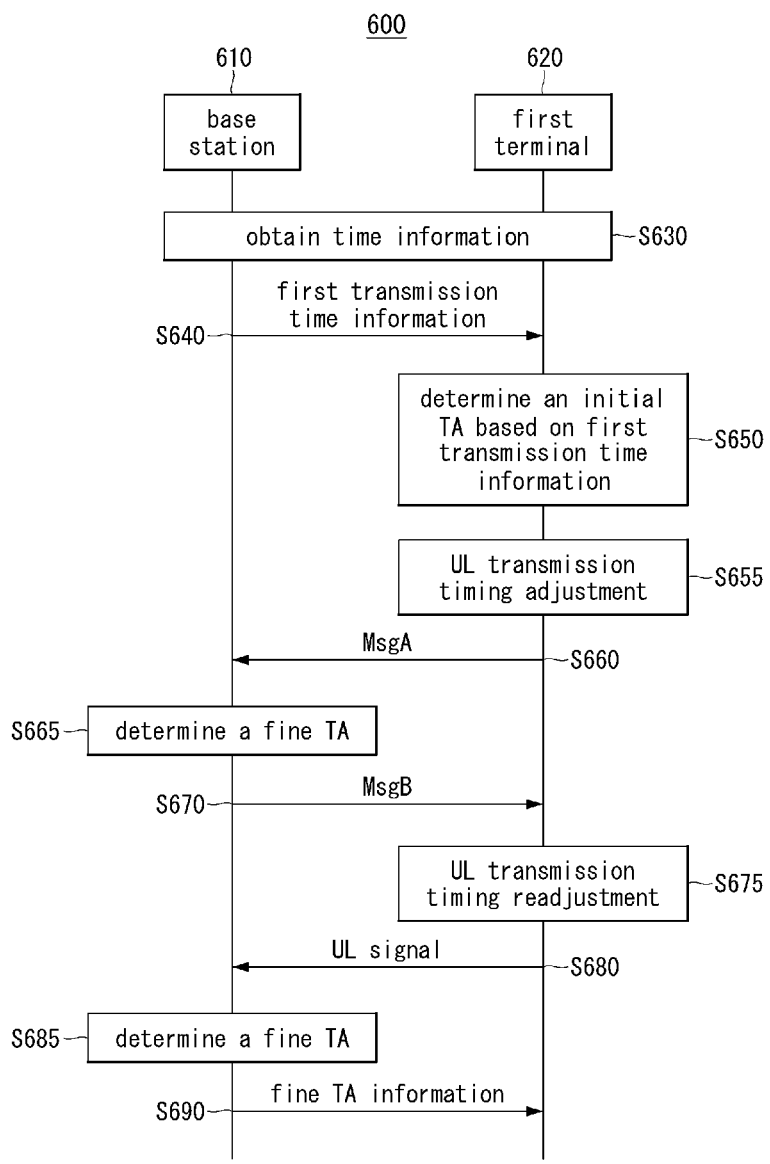

METHOD AND APPARATUS FOR TIMING CONTROL IN WIRELESS COMMUNICATION SYSTEM

CROSS-REFERENCE TO RELATED APPLICATIONS

This application claims priority to Korean Patent Applications No. 10-2020-0106150 filed on Aug. 24, 2020 and No. 10-2021-0110401 filed on Aug. 20, 2021 with the Korean Intellectual Property Office (KIPO), the entire contents of which are hereby incorporated by reference.

BACKGROUND

1. Technical Field

The present disclosure relates to timing control techniques in a wireless communication system, and more particularly, to techniques of effectively performing timing control through timing advances (TAs) for matching reception timings of uplink signals from a plurality of terminals connected to a base station.

2. Description of Related Art

With the development of information and communication technology, various wireless communication technologies have been developed. Typical wireless communication technologies include long term evolution (LTE) and new radio (NR), which are defined in the 3rd generation partnership project (3GPP) standards. The LTE may be one of 4th generation (4G) wireless communication technologies, and the NR may be one of 5th generation (5G) wireless communication technologies.

In an exemplary embodiment of a wireless communication system, a plurality of terminals may be connected to one base station. In communication between each of the terminals and the base station, a propagation delay may occur due to a physical distance therebetween. Due to different locations of the plurality of terminals connected to the base station, propagation delays of the plurality of terminals with respect to the base station may be different from each other. Due to the different propagation delays of the plurality of terminals, a mismatch of reception timings may occur at the base station between a plurality of uplink signals transmitted from the plurality of terminals. Due to the different propagation delays of the plurality of terminals, interference may occur between the plurality of uplink signals transmitted from the plurality of terminals. Alternatively, due to the different propagation delays of the plurality of terminals, interference may occur between uplink signals and downlink signals.

A wireless communication system such as the 5G NR system may support intra-cell orthogonality for uplink signals. When the intra-cell orthogonality for uplink signals is supported, a plurality of uplink signals transmitted from a plurality of terminals connected to one base station may not cause mutual interference. In order to maintain the intra-cell orthogonality of uplink signals, slot boundaries or timings of the plurality of uplink signals may need to be aligned within a predetermined reference error. For example, in order to maintain the intra-cell orthogonality for uplink signals, timing alignment errors of the plurality of uplink signals may be within a cyclic prefix (CP). In order to match the reception timings of the plurality of uplink signals, the base station may control each of the plurality of terminals so that each of transmission timings of the plurality of uplink signals is advanced or delayed by a predetermined timing advance (TA). As such, a technique for effectively performing timing control through a TA may be required.

Matters described as the prior arts are prepared to promote understanding of the background of the present disclosure, and may include matters that are not already known to those of ordinary skill in the technology domain to which exemplary embodiments of the present disclosure belong.

SUMMARY

In order to solve the above-identified problems, exemplary embodiments of the present disclosure are directed to providing a timing control method for effectively performing timing control through a timing advance even in a situation where a large transmission delay exists.

According to an exemplary embodiment of the present disclosure for achieving the above-described objective, a timing control method performed by a terminal included in a communication network may comprise: configuring an initial timing reference based on time information obtained from the communication network; receiving a first downlink (DL) signal from a base station; based on the initial timing reference and the first DL signal, obtaining first transmission time information that is information on a timing when the first DL signal is transmitted by the base station and first reception time information that is information on a timing when the first DL signal is received by the terminal; determining a first timing advance (TA) value based on comparison between the first reception time information and the first transmission time information; and adjusting an uplink (UL) transmission timing for the base station based on the first TA value.

The determining of the first TA value may comprise: identifying a first difference value corresponding to a difference between the timing when the first DL signal is received by the terminal and the timing when the first DL signal is transmitted by the base station; and determining the first TA value based on the first difference value.

The determining of the first TA value may comprise: identifying a first difference value corresponding to a difference between the timing when the first DL signal is received by the terminal and the timing when the first DL signal is transmitted by the base station; identifying whether first additional information is included in the first DL signal; calculating a first reference value based on the first additional information when the first additional information is included in the first DL signal; and determining the first TA value based on the first difference value and the first reference value.

The determining of the first TA value may comprise determining the first TA value based on the first difference value when the first additional information is not included in the first DL signal.

The timing control method may further comprise: transmitting a first UL signal to the base station based on the UL transmission timing adjusted through the adjusting; receiving a second DL signal transmitted by the base station as a response to the first UL signal; performing readjustment on the UL transmission timing based on a second TA value when the second DL signal includes information on the second TA value; and transmitting a second UL signal to the base station based on the readjusted UL transmission timing.

The first UL signal may be a message 1 (Msg1) according to a 4-step random access channel (RACH) procedure, the second DL signal may be a message 2 (Msg2) according to the 4-step RACH procedure, and the second UL signal may be a message 3 (Msg3) according to the 4-step RACH procedure.

The first UL signal may be a message A (MsgA) according to a 2-step RACH procedure, and the second DL signal may be a message B (MsgB) according to the 2-step RACH procedure.

According to another exemplary embodiment of the present disclosure for achieving the above-described objective, a timing control method performed by a base station included in a communication network may comprise: configuring an initial timing reference based on time information obtained from the communication network; transmitting a first downlink (DL) signal including information on a first transmission timing to a terminal included in the communication network at the first transmission timing identified based on the initial timing reference; receiving, from the terminal, a first uplink (UL) signal transmitted based on an uplink (UL) transmission timing adjusted based on the information on the first transmission timing included in the first DL signal; and determining a first timing advance (TA) value for readjustment of the UL transmission timing of the terminal based on the first UL signal.

The determining of the first TA value may comprise: identifying a first difference value corresponding to a difference between a first reception timing when the first UL signal is received by the base station and a reception timing of the base station itself; and determining the first TA value based on the first difference value.

The timing control method may further comprise: comparing a size of the first TA value with a predetermined reference error value; and when the size of the first TA value is equal to or greater than the predetermined reference error value, transmitting a second DL signal including information on the determined first TA value to the terminal.

The timing control method may further comprise: comparing a size of the first TA value with a predetermined reference error value; and when the size of the first TA value is less than the predetermined reference error value, determining that readjustment of the UL transmission timing is not required for the terminal.

The first UL signal may be a message 1 (Msg1) or a message A (MsgA) according to a random access channel (RACH) procedure.

According to yet another exemplary embodiment of the present disclosure for achieving the above-described objective, a terminal included in a communication network may comprise: a processor; a memory electronically communicating with the processor; and instructions stored in the memory, wherein when executed by the processor, the instructions cause the terminal to: configure an initial timing reference based on time information obtained from the communication network; receive a first downlink (DL) signal from a base station; based on the initial timing reference and the first DL signal, obtain first transmission time information that is information on a timing when the first DL signal is transmitted by the base station and first reception time information that is information on a timing when the first DL signal is received by the terminal; determine a first timing advance (TA) value based on comparison between the first reception time information and the first transmission time information; and adjust an uplink (UL) transmission timing for the base station based on the first TA value.

The instructions may further cause the terminal to: identify a first difference value corresponding to a difference between the timing when the first DL signal is received by the terminal and the timing when the first DL signal is transmitted by the base station; identify whether first additional information is included in the first DL signal; calculate a first reference value based on the first additional information when the first additional information is included in the first DL signal; and determine the first TA value based on the first difference value and the first reference value.

The instructions may further cause the terminal to: transmit a first UL signal to the base station based on the UL transmission timing adjusted through the adjusting; receive a second DL signal transmitted by the base station as a response to the first UL signal; perform readjustment on the UL transmission timing based on a second TA value when the second DL signal includes information on the second TA value; and transmit a second UL signal to the base station based on the readjusted UL transmission timing.

The first UL signal may be a message 1 (Msg1) or a message A (MsgA) according to a random access channel (RACH) procedure, and the second DL signal may be a message 2 (Msg2) or a message B (MsgB) according to the RACH procedure.

According to exemplary embodiments of the present disclosure, in a wireless communication system, a terminal may determine an initial TA value by comparing a transmission timing of a downlink signal received from a base station, which is included in the downlink signal, and a reception timing at which the terminal receives the downlink signal. The terminal may adjust an uplink transmission timing based on the determined initial TA value. The base station may inform the terminal of a fine TA value determined based on an uplink signal transmitted by the terminal based on the adjusted uplink transmission timing. The terminal may finely adjust the uplink transmission timing based on the fine TA value obtained from the base station. Through this, uplink transmission timing control for each terminal may be performed without a large expansion of a TA window or a large increase in control signal overhead in a wireless network environment having a large transmission delay.

BRIEF DESCRIPTION OF DRAWINGS

FIG. 4 is a sequence chart illustrating a first exemplary embodiment of a timing control method in a wireless communication system.

FIG. 6 is a sequence chart illustrating a third exemplary embodiment of a timing control method in a wireless communication system.

DETAILED DESCRIPTION OF THE EMBODIMENTS

Figure 1:
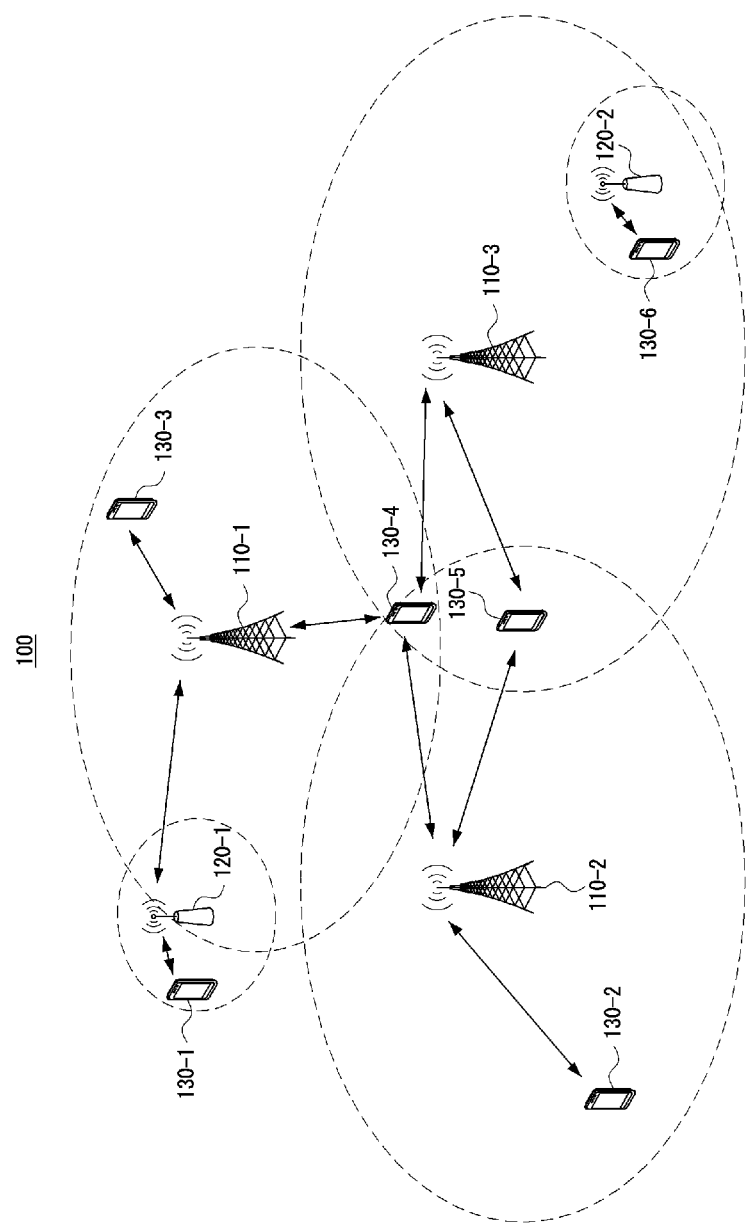
FIG. 1 is a conceptual diagram illustrating an exemplary embodiment of a communication system.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may refer to "at least one A or B" or "at least one of one or more combinations of A and B". In addition, "one or more of A and B" may refer to "one or more of A or B" or "one or more of one or more combinations of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may have the same meaning as a communication network.

Throughout the present specification, a network may include, for example, a wireless Internet such as wireless fidelity (WiFi), mobile Internet such as a wireless broadband Internet (WiBro) or a world interoperability for microwave access (WiMax), 2G mobile communication network such as a global system for mobile communication (GSM) or a code division multiple access (CDMA), 3G mobile communication network such as a wideband code division multiple access (WCDMA) or a CDMA2000, 3.5G mobile communication network such as a high speed downlink packet access (HSDPA) or a high speed uplink packet access (HSUPA), 4G mobile communication network such as a long term evolution (LTE) network or an LTE-Advanced network, 5G mobile communication network, or the like.

Throughout the present specification, a terminal may refer to a mobile station, mobile terminal, subscriber station, portable subscriber station, user equipment, an access terminal, or the like, and may include all or a part of functions of the terminal, mobile station, mobile terminal, subscriber station, mobile subscriber station, user equipment, access terminal, or the like.

Here, a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video recorder, digital video player, or the like having communication capability may be used as the terminal.

Throughout the present specification, the base station may refer to an access point, radio access station, node B, evolved node B (eNodeB), base transceiver station, mobile multihop relay (MMR)-BS, or the like, and may include all or part of functions of the base station, access point, radio access station, nodeB, eNodeB, base transceiver station, MMR-BS, or the like.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. The plurality of communication nodes may support 4th generation (4G) communication (e.g., long term evolution (LTE), LTE-advanced (LTE-A)), 5th generation (5G) communication (e.g., new radio (NR)), or the like. The 4G communication may be performed in a frequency band of 6 gigahertz (GHz) or below, and the 5G communication may be performed in a frequency band of 6 GHz or above.

For example, for the 4G and 5G communications, the plurality of communication nodes may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix OFDM (CP-OFDM) based communication protocol, a discrete Fourier transform spread OFDM (DFT-s-OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like.

In addition, the communication system 100 may further include a core network. When the communication system 100 supports the 4G communication, the core network may comprise a serving gateway (S-GW), a packet data network (PDN) gateway (P-GW), a mobility management entity (MME), and the like. When the communication system 100 supports the 5G communication, the core network may comprise a user plane function (UPF), a session management function (SMF), an access and mobility management function (AMF), and the like.

Meanwhile, each of the plurality of communication nodes 110-1, 110-2, 110-3, 120-1, 120-2, 130-1, 130-2, 130-3, 130-4, 130-5, and 130-6 constituting the communication system 100 may have the following structure.

Figure 2:
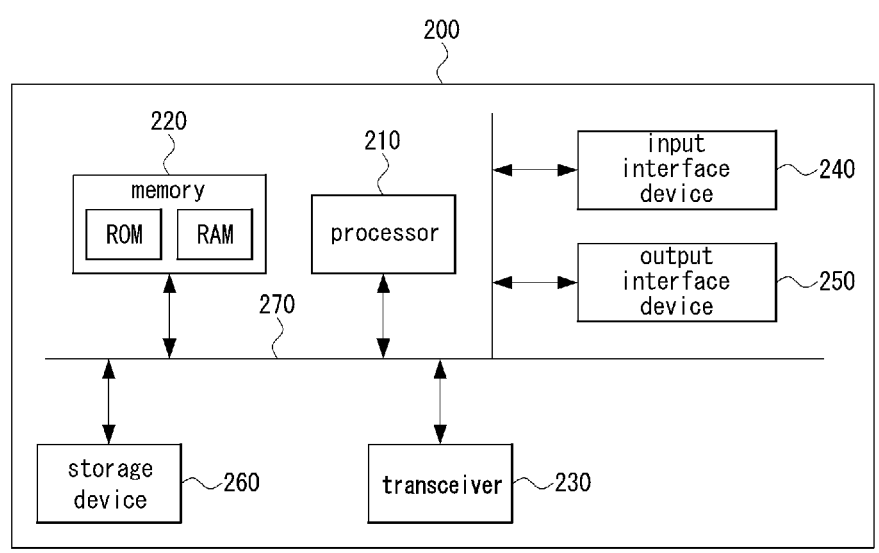
FIG. 2 is a block diagram illustrating an exemplary embodiment of a communication node constituting a communication system.

FIG. 2 is a block diagram illustrating a first embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. The communication system 100 including the base stations 110-1, 110-2, 110-3, 120-1, and 120-2 and the terminals 130-1, 130-2, 130-3, 130-4, 130-5, and 130-6 may be referred to as an 'access network'. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a base transceiver station (BTS), a radio base station, a radio transceiver, an access point, an access node, a road side unit (RSU), a radio remote head (RRH), a transmission point (TP), a transmission and reception point (TRP), an eNB, a gNB, or the like.

Here, each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, an Internet of things (IoT) device, a mounted apparatus (e.g., a mounted module/device/terminal or an on-board device/terminal, etc.), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support multi-input multi-output (MIMO) transmission (e.g., a single-user MIMO (SU-MIMO), multi-user MIMO (MU-MIMO), massive MIMO, or the like), coordinated multipoint (CoMP) transmission, carrier aggregation (CA) transmission, transmission in an unlicensed band, device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2, and operations supported by the plurality of base stations 110-1, 110-2, 110-3, 120-1, and 120-2. For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, timing control methods in a wireless communication system will be described. Even when a method (e.g., transmission or reception of a data packet) performed at a first communication node among communication nodes is described, the corresponding second communication node may perform a method (e.g., reception or transmission of the data packet) corresponding to the method performed at the first communication node. That is, when an operation of a terminal is described, the corresponding base station may perform an operation corresponding to the operation of the terminal. Conversely, when an operation of the base station is described, the corresponding terminal may perform an operation corresponding to the operation of the base station.

Figure 3A:
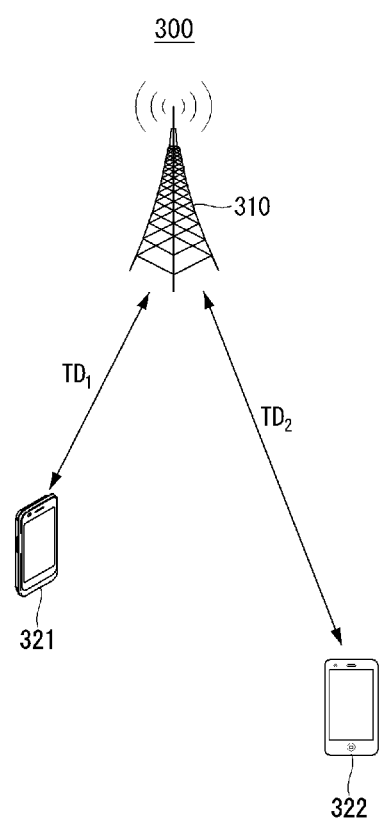
FIGS. 3A to 3C are diagrams for describing an exemplary embodiment of a method for controlling transmission/reception timing of an uplink signal and a downlink signal in a wireless communication system.
Figure 3B:
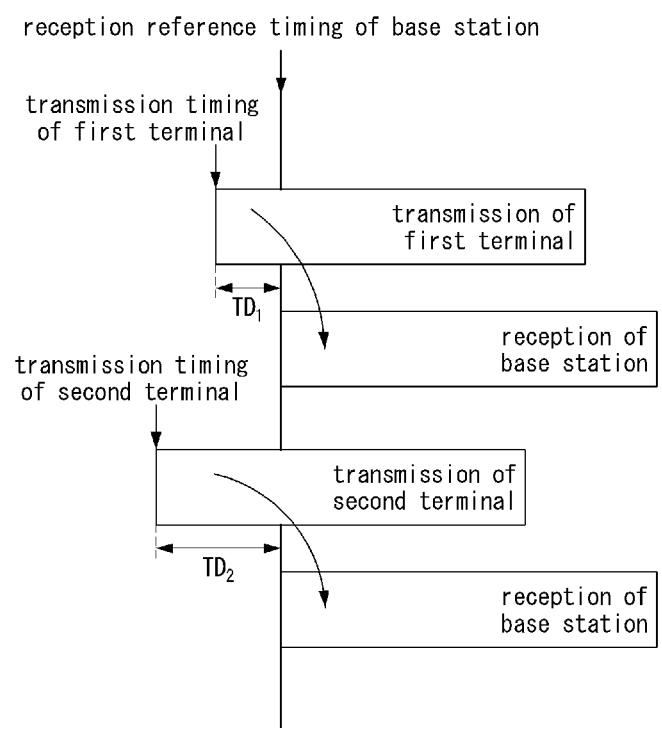
Figure 3C:
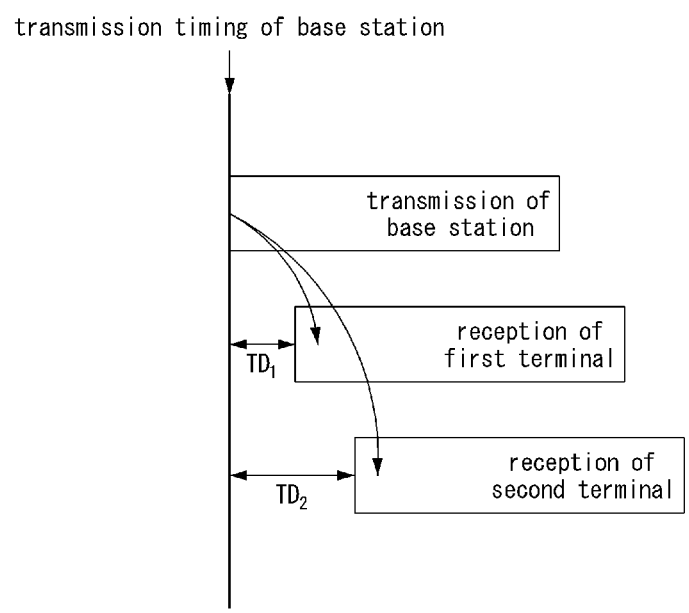

FIGS. 3A to 3C are diagrams for describing an exemplary embodiment of a method for controlling transmission/reception timing of an uplink signal and a downlink signal in a wireless communication system.

Referring to FIG. 3A, a communication system 300 may include one or more base stations and one or more terminals. The one or more terminals may perform communication by being connected to the one or more base stations. FIG. 3A shows an exemplary embodiment in which two terminals 321 and 322 are connected to one base station 310 to perform communications. However, this is only an example for convenience of description, and exemplary embodiments of the present disclosure are not limited thereto. For example, exemplary embodiments of the present disclosure may be equally or similarly applied to an exemplary embodiment in which three or more terminals are connected to one or more base stations to perform communications.

The communication system 300 may include the base station 310, the first terminal 321, and the second terminal 322. The first and second terminals 321 and 322 may be connected to the base station 310 to perform communications with the base station 310. Propagation delays may occur in the communication between the first terminal 321 and the base station 310 and the communication between the second terminal 322 and the base station 310. Alternatively, time delays (TDs) may occur in the communication between the first terminal 321 and the base station 310 and the communication between the second terminal 322 and the base station 310. Here, the first and second terminals 321 and 322 may be connected the base station 310 at different locations. The physical distance between the first terminal 321 and the base station 310 and the physical distance between the second terminal 322 and the base station 310 may be different from each other. The propagation delay between the first terminal 321 and the base station 310 and the propagation delay between the second terminal 322 and the base station 310 may be different from each other. Specifically, it may take a time equal to a first time delay $TD_1$ until a radio signal transmitted from the first terminal 321 to the base station 310 arrives at the base station 310. Conversely, until a radio signal transmitted from the base station 310 to the first terminal 321 reaches the first terminal 321, it may take a time equal to the first time delay $TD_1$. On the other hand, until a radio signal transmitted from the second terminal 322 to the base station 310 reaches the base station 310, it may take a time equal to a second time delay $TD_2$. Conversely, until a radio signal transmitted from the base station 310 to the second terminal 322 reaches the second terminal 322, it may take a time equal to the second time delay $TD_2$. When the first and second terminals 321 and 322 are connected to the base station 310 at different locations, the first time delay $TD_1$ and the second time delay $TD_2$ may have different values.

Referring to FIGS. 3B and 3C, the propagation delay between the base station 310 and the first terminal 321 and the propagation delay between the base station 310 and the second terminal 322 may be different from each other. An uplink signal transmission timing of the first terminal 321 may be different from an uplink signal transmission timing of the second terminal 322, and a downlink signal reception timing of the first terminal 321 may be different from a downlink signal reception timing of the second terminal 322.

Referring to FIG. 3B, in order for the base station 310 to simultaneously receive the uplink signal transmitted from the first terminal 321 and the uplink signal transmitted from the second terminal 322 at a predetermined reception reference timing, the first and second terminals 321 and 322 may have to transmit the uplink signals at different timings. For example, the first terminal 321 may transmit the uplink signal at a timing ahead of the reception reference timing of the base station 310 by the first time delay $TD_1$. The second terminal 322 may transmit the uplink signal at a timing ahead of the reception reference timing of the base station 310 by the second time delay $TD_2$. Through this, the base station 310 may simultaneously receive the uplink signals transmitted from the first and second terminals 321 and 322 at the reception reference timing of the base station 310.

On the other hand, referring to FIG. 3C, when the base station 310 simultaneously transmits downlink signals for the first and second terminals 321 and 322 at a predetermined transmission reference timing, the first terminal 321 and the second terminal 322 may receive the downlink signals at different timings. For example, when the base station 310 transmits the downlink signal to the first terminal 321 at the predetermined transmission reference timing, the first terminal 321 may receive the downlink signal at a timing later than the predetermined transmission reference timing by the first time delay $TD_1$. When the base station 310 transmits the downlink signal to the second terminal 322 at the predetermined transmission reference timing, the second terminal 322 may receive the downlink signal at a timing later than the predetermined transmission reference timing by the second time delay $TD_2$.

In an exemplary embodiment of the communication system 300, the base station 310 may support intra-cell orthogonality for uplink signals. When the intra-cell orthogonality of uplink signals is supported, a plurality of uplink signals transmitted from the plurality of terminals 321 and 322 connected to the base station 310 may not cause mutual interference. In order to maintain the intra-cell orthogonality of uplink signals, slot boundaries or timings of the plurality of uplink signals may need to be aligned within a predetermined reference error. For example, in order to maintain the intra-cell orthogonality of uplink signals, a reception timing alignment error for the uplink signal from the first terminal 321 and the uplink signal from the second terminal 322 may need to be within a cyclic prefix (CP).

The propagation delay between the first terminal 321 and the base station 310 and the propagation delay between the second terminal 322 and the base station 310 may be different from each other. A mismatch may occur between the reception timing of the uplink signal transmitted from the first terminal 321 and the reception timing of the uplink signal transmitted from the second terminal 322. Due to such the mismatch between the uplink signal reception timings, interference may occur between the uplink signal transmitted from the first terminal 321 and the uplink signal transmitted from the second terminal 322. Alternatively, interference may occur between an uplink signal and a downlink signal between the first and second terminals 321 and 322 and the base station 310.

In order to match the reception timings of the plurality of uplink signals, the base station 310 may instruct each of the first terminal 321 and the second terminal 322 to adjust the uplink transmission timing. For example, the base station may instruct the first terminal 321 to transmit the uplink signal at a timing earlier than a predetermined timing by the first time delay $TD_1$, and instruct the second terminal 322 to transmit the uplink signal at a timing earlier than the predetermined timing by the second time delay $TD_2$. In other words, the base station may instruct the first terminal 321 to perform timing adjustment based on a TA corresponding to the first time delay $TD_1$, and the second terminal 322 to perform timing adjustment based on a TA corresponding to the second time delay $TD_2$. However, this is only an example for convenience of description, and exemplary embodiments of the present disclosure are not limited thereto. For example, the base station 310 may instruct the first terminal 321 and the second terminal 322 to perform timing adjustment based on two TA values set to have a difference equal to the difference between the first time delay $TD_1$ and the second time delay $TD_2$.

FIG. 4 is a sequence chart illustrating a first exemplary embodiment of a timing control method in a wireless communication system.

Referring to FIG. 4, a communication system 400 may include one or more base stations (BSs) and one or more terminals (e.g., user equipments (UEs)). one or more base stations may form a cell coverage in a predetermined communicable area, and provide services to terminals within the cell coverage. A terminal located within the cell coverage of the one or more base stations among the one or more terminals may access a communication network and receive a service by being connected to the base station forming the cell coverage. FIG. 4 shows a communication system including one base station and a plurality of terminals as an example. However, this is only an example for convenience of description, and exemplary embodiments of the present disclosure are not limited thereto.

In an exemplary embodiment, the communication system 400 may include a base station 410 and a plurality of terminals 421 and 422. The plurality of terminals 421 and 422 may be referred to as the first terminal 421 and the second terminal 422, respectively. The base station 410 may be the same as or similar to the base station 310 described with reference to FIGS. 3A to 3C. The first and second terminals 421 and 422 may be the same as or similar to the first and second terminals 321 and 322 described with reference to FIGS. 3A to 3C.

The base station 410 may provide services to terminals within a cell coverage by forming the cell coverage in a predetermined communicable area. The first and second terminals 421 and 422 may be connected to the base station 410 within the cell coverage of the base station 410. Locations at which the first and second terminals 421 and 422 are connected the base station 410, respectively, may be different from each other. The first and second terminals 421 and 422 may have different distances from the base station 410. Due to the different locations of the first and second terminals 421 and 422, propagation delays between the first and second terminals 421 and 422 and the base station 410 may have different values. In order for timings at which uplink signals of the first and second terminals 421 and 422 are received at the base station 410 to coincide with each other, control on uplink transmission timings of the first and second terminals 421 and 422 may be performed based on the following operations.

The base station 410, the first terminal 421, and the second terminal 422 may obtain time information from a communication network or a predetermined system capable of obtaining time information (S430). For example, the base station 410, the first terminal 421, and the second terminal 422 may individually obtain the time information through a satellite navigation system such as a global navigation satellite system (GNSS) or a global positioning system (GPS). Alternatively, the base station 410 may obtain time information from a core network (not shown). The base station 410 may transmit the time information obtained from the core network to the first and second terminals 421 and 422. The time information obtained by the base station 410, the first terminal 421, and the second terminal 422 in the step S430 may correspond to absolute time information. The time information obtained by the base station 410, the first terminal 421, and the second terminal 422 in the step S430 may correspond to network time information or network synchronization time information set by the connected communication network itself. Based on the time information obtained in the step S430, the base station 410, the first terminal 421, and the second terminal 422 may set or obtain a predetermined initial timing reference. The first terminal 421 and the second terminal 422 may share the same or similar initial timing reference.

The base station 410 may transmit a first downlink signal to the first and second terminals 421 and 422 (S441 and S442). The base station 410 may include, in the first downlink signal transmitted to the first and second terminals 421 and 422, first transmission time information, which is information on a timing (i.e., first transmission timing) at which the first downlink signal is transmitted. For example, the first transmission time information may correspond to a time stamp value for the transmission timing of the first downlink signal. The first transmission time information may be referred to as 'frame transmission timing information'. The base station 410 may transmit the first downlink signal in a broadcast, multicast, or unicast scheme. For example, the base station 410 may transmit the first downlink signal to the first and second terminals 421 and 422 that are not yet connected to the base station 410 in the broadcast scheme. The base station 410 may transmit the first downlink signal to the first and second terminals 421 and 422 connected to the base station 410 in the multicast or unicast scheme. The first downlink signal may include system information or a system information block (SIB). In the first downlink signal, the first transmission time information may be included in the system information or system information block. On the other hand, the first downlink signal may correspond to a dedicated radio resource control (RRC) signaling message. The first transmission time transmission may be transmitted by being included in the first downlink signal corresponding to the dedicated RRC signaling message.

The first and second terminals 421 and 422 may receive the first downlink signal transmitted from the base station 410 (S441 and S442). The first and second terminals 421 and 422 may obtain the first transmission time information from the first downlink signal. Meanwhile, each of the first and second terminals 421 and 422 may identify first reception time information, which is information on a timing (i.e., first reception timing) at which the first downlink signal is received. Each of the first and second terminals 421 and 422 may determine an initial timing advance (TA) value based on the first transmission time information and the first reception time information for the first downlink signal (S451, S452).

First Exemplary Embodiment of Initial TA Value Determination Scheme

Each of the first and second terminals 421 and 422 may determine an initial TA value based on comparison between the first transmission timing and the first reception timing for the first downlink signal (S451 and S452). For example, each of the first and second terminals 421 and 422 may determine the initial TA value based on an operation shown in Equation 1.

$$TA_{int}=T_{rx}-T_{tx}$$ [Equation 1]

Here, $TA_{int}$ may mean the initial TA value. $T_{rx}$ may mean the first reception timing. $T_{tx}$ may mean the first transmission timing. That is, the initial TA value $TA_{int}$ may be determined as a difference between the first reception timing $T_{rx}$ and the first transmission timing $T_{tx}$. In other words, the initial TA value $TA_{int}$ may correspond to a time interval from the time when the first downlink signal is transmitted from the base station 410 to the time when the first downlink signal is received at each of the first and second terminals 421 and 422. Alternatively, the initial TA value $TA_{int}$ may be determined based on a time interval from when the first downlink signal is transmitted from the base station 410 to when it is received by each of the first and second terminals 421 and 422.

Second Exemplary Embodiment of Initial TA Value Determination Scheme

Each of the first and second terminals 421 and 422 may determine the initial TA value based on comparison between the first transmission timing and the first reception timing for the first downlink signal (S451 and S452). For example, each of the first and second terminals 421 and 422 may determine the initial TA value based on an operation expressed in Equation 2.

$$TA_{int}=T_{rx}-T_{tx}+\alpha$$ [Equation 2]

Here, $TA_{int}$ may mean the initial TA value. $T_{rx}$ may mean the first reception timing. $T_{tx}$ may mean the first transmission timing. Meanwhile, $\alpha$ may mean a first reference value determined based on predetermined additional information provided from the base station 410 to determine the initial TA value. Here, the additional information may include at least one of a transmission delay between the base station 410 and a core network, a transmission delay between the base station 410 and a satellite of a non-terrestrial network (NTN), a transmission delay between a satellite of a satellite navigation system and each of the base station 410, the first terminal 421, and the second terminal 422, and information related to other transmission delays in the other communication system 400. For example, the additional information may include information on delays occurring in a feeder link, the satellite, or the terrestrial communication system 400 in a transparent payload-based NTN structure. The first reference value $\alpha$ may be determined to be the same as a value included in the additional information. However, this is only an example for convenience of description and exemplary embodiments of the present disclosure are not limited thereto. For example, the first reference value $\alpha$ may be determined through a separate operation based on one or more values included in the additional information. The base station 410 may transmit the additional information to the first and second terminals 421 and 422 by including the additional information in the first downlink signal including the first transmission time information. Alternatively, the base station 410 may transmit information on the first reference value $\alpha$ determined based on the additional information to the first and second terminals 421 and 422 by including it in the first downlink signal including the first transmission time information.

As in the first exemplary embodiment of the initial TA value determination scheme, each of the first and second terminals 421 and 422 may determine the initial TA value based on the first transmission time information and the first reception time information. On the other hand, as in the second exemplary embodiment of the initial TA value determination scheme, each of the first and second terminals 421 and 422 may determine the initial TA value based on the first transmission time information, the first reception time information, and the first reference value determined according to the predetermined additional information. In the first downlink signal, the base station 410 may explicitly indicate whether the first and second terminals 421 and 422 determine the initial TA value according to the first exemplary embodiment or the second exemplary embodiment of the initial TA value determination scheme. Alternatively, the base station 410 may implicitly indicate the initial TA value determination scheme for the first and second terminals 421 and 422 by including or not including the additional information in the first downlink signal. In other words, when the additional information or the first reference value is included in the first downlink signal received from the base station 410, each of the first and second terminals 421 and 422 may determine the initial TA value according to the second exemplary embodiment of the initial TA value determination scheme. On the other hand, when the first downlink signal received from the base station 410 does not include the additional information or the first reference value, each of the first and second terminals 421 and 422 may determine the initial TA value according to the first exemplary embodiment of the initial TA value determination scheme.

The first and second terminals 421 and 422 may adjust the uplink transmission timings based on the initial TA values determined in the steps S451 and S452, respectively (S456 and S457). For example, when the determined initial TA value is a positive real number, each of the first and second terminals 421 and 422 may set the uplink transmission timing to be advanced by the initial TA value. When the determined initial TA value is a negative real number, each of the first and second terminals 421 and 422 may set the uplink transmission timing to be delayed by the initial TA value. On the other hand, when the determined initial TA value is 0, each of the first and second terminals 421 and 422 may terminate the uplink transmission timing adjustment operation without adjusting the uplink transmission timing.

The first and second terminals 421 and 422 may transmit uplink signals to the base station 410 based on the uplink transmission timings adjusted in the steps S456 and S457, respectively (S461 and S462). As described above, the uplink signals transmitted to the base station 410 based on the uplink transmission timings adjusted by the first and second terminals 421 and 422 may be received by the base station 410 at the same or similar timings. In other words, the timing at which the base station 410 receives the uplink signal transmitted from the first terminal 421 and the timing at which the base station 410 receives the uplink signal transmitted from the second terminal 422 may be the same or close to each other.

The base station 410, the first terminal 421, and the second terminals 421 and 422 may perform the timing control operations based on the operations according to the steps S430 to S462. However, this is only an example for convenience of description, and exemplary embodiments of the present disclosure are not limited thereto. For example, after the downlink transmission of the first downlink signal in the steps S441 and S442, the base station 410 may additionally transmit a second downlink signal including second transmission time information. Each of the first and second terminals 421 and 422 may determine two initial TA values based on the first and second downlink signals. Each of the first and second terminals 421 and 422 may perform uplink transmission timing adjustment based on an average value of the two initial TA values determined based on the first and second downlink signals. Alternatively, the first and second terminals 421 and 422 may perform uplink transmission timing adjustment based on any one of the two initial TA values determined based on the first and second downlink signals.

Figure 5:
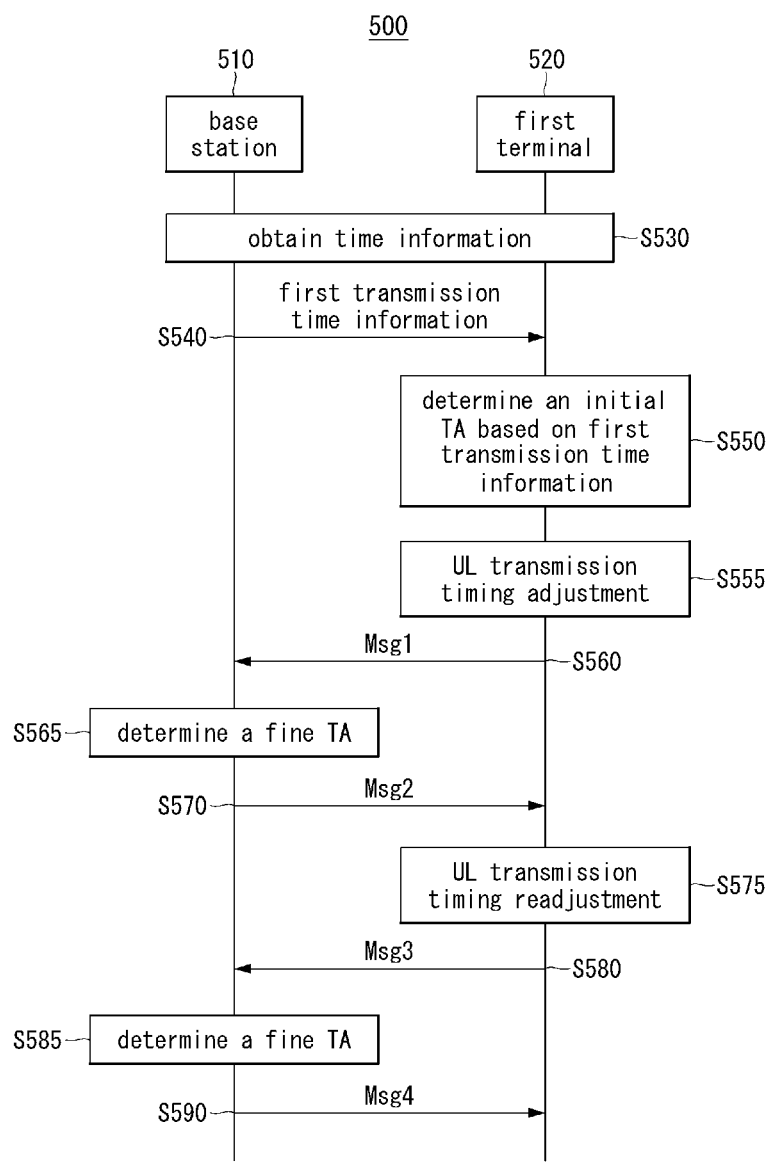
FIG. 5 is a sequence chart illustrating a second exemplary embodiment of a timing control method in a wireless communication system.

FIG. 5 is a sequence chart illustrating a second exemplary embodiment of a timing control method in a wireless communication system.

Referring to FIG. 5, a communication system 500 may include one or more base stations (BSs) and one or more terminals (e.g., user equipments (UEs)). FIG. 5 shows a communication system including one base station and a plurality of terminals as an example. However, this is only an example for convenience of description, and exemplary embodiments of the present disclosure are not limited thereto. For example, the communication system 500 may be configured to include a plurality of base stations and/or a plurality of terminals.

For example, the communication system 500 may include a base station 510 and a first terminal 520. Here, the base station 510 may be the same as or similar to the base station 410 described with reference to FIG. 4. The first terminal 520 may be the same as or similar to the first and second terminals 421 and 422 described with reference to FIG. 4. Hereinafter, in describing a second exemplary embodiment of a timing control method in a wireless communication system with reference to FIG. 5, content overlapping with that described with reference to FIG. 4 may be omitted.

The base station 510 and the first terminal 520 may obtain time information from a communication network or a predetermined system capable of obtaining time information (S530). The operation of obtaining the time information in the step S530 may be the same as or similar to the operation of obtaining time information according to the step S430 described with reference to FIG. 4. Based on the time information obtained in the step S530, the base station 510 and the first terminal 520 may set or obtain a predetermined initial timing reference. The base station 510 and the first terminal 520 may share the same or similar initial timing reference.

The base station 510 may transmit a first downlink signal including first transmission time information to the first terminal 520 (S540). The first terminal 520 may receive the first downlink signal transmitted from the base station 510 (S540). The first downlink signal transmission/reception operation in the step S540 may be the same as or similar to the first downlink signal transmission/reception operation according to the steps S441 and S442 described with reference to FIG. 4.

The first terminal 520 may obtain the first transmission time information from the first downlink signal received from the base station 510. Meanwhile, the first terminal 520 may identify first reception time information, which is information on a timing (i.e., first reception timing) at which the first downlink signal is received. The first terminal 520 may determine an initial timing advance (TA) value based on the first transmission time information and the first reception time information for the first downlink signal (S550). The operation of determining the initial TA value in the step S550 may be the same as or similar to the operation of determining the initial TA value according to the steps S451 and S452 described with reference to FIG. 4. In the step S550, the first terminal 520 may determine the initial TA value according to the first or second exemplary embodiment of the initial TA value determination scheme described with reference to FIG. 4. The initial TA value $TA_{int}$ determined as described above may be determined as $(TA_{int}=T_{rx}-T_{tx})$ or $(TA_{int}=T_{rx}-T_{tx}+\alpha)$. Here, $T_{rx}$ may mean the first reception timing. $T_{tx}$ may mean the first transmission timing. Meanwhile, α may mean a first reference value determined based on predetermined additional information provided from the base station 510 to determine the initial TA value. The first terminal 520 may adjust an uplink transmission timing based on the initial TA value determined in the step S550 (S555). The uplink transmission timing adjustment operation in the step S555 may be the same as or similar to the uplink transmission timing adjustment operation in the steps S456 and S457 described with reference to FIG. 4.

The first terminal 520 may perform a random access channel (RACH) procedure after adjusting the uplink transmission timing as in the step S555. In the RACH procedure, in order for the first terminal 520 and the base station 510 to secure mutual timing synchronization or in order for the terminal 520 to connect to the base station 510, the first terminal 520 and the base station 510 may perform transmission and reception of a plurality of RACH messages. The RACH procedure may be performed in situations such as initial access, RRC reconfiguration, and handover. The RACH procedure may be configured with four steps (4-step) or two steps (2-step).

Referring to FIG. 5, the first terminal 520 may transmit a message 1 (Msg1) for a 4-step RACH procedure to the base station 510 (S560). Here, the first terminal 520 may transmit the Msg1 to the base station 510 based on the uplink transmission timing adjusted in the step S555. In an exemplary embodiment of the communication system 500, the first terminal 520 may transmit the Msg1 by including the initial TA value determined in the step S550 in the Msg1.

The base station 510 may receive the Msg1 from the first terminal 520 (S560). The base station 510 may identify a timing of receiving the Msg1 from the first terminal 520. The base station 510 may compare the timing of receiving the Msg1 from the first terminal 520 with the reception reference timing of the base station 510. The base station 510 may determine a fine TA value for fine adjustment of the uplink signal transmission timing of the first terminal 520 based on comparison between the timing of receiving the Msg1 from the first terminal 520 and the reception reference timing of the base station 510 (S565). For example, the fine TA value may be determined as in Equation 3.

$$TA_{fine} = T_{rx\_ul} - T_{rx\_ref}$$ [Equation 3]

Here, $TA_{fine}$ may mean the fine TA value. $T_{rx\_ul}$ may mean a reception timing at which the base station 510 receives the uplink signal such as the Msg1 from the first terminal 520. $T_{rx\_ref}$ may mean the reception reference timing of the base station 510. Referring to Equation 3, when the Msg1 from the first terminal 520 arrives earlier than the reception reference timing of the base station 510, the fine TA value $TA_{fine}$ may have a negative real value. When the Msg1 from the first terminal 520 arrives later than the reception reference timing of the base station 510, the fine TA value $TA_{fine}$ may have a positive real value. When the Msg1 from the first terminal 520 arrives at the same time as the reception reference timing of the base station 510, the fine TA value $TA_{fine}$ may have a value of 0.

Upon receiving the Msg1 from the first terminal 520, the base station 510 may transmit a message 2 (Msg2) to the first terminal 520 according to the RACH procedure (S570). Here, the base station 510 may include the fine TA value determined in the step S565 in the Msg2 transmitted to the first terminal 520. In other words, the base station 510 may deliver the fine TA value for fine adjustment of the uplink transmission timing of the first terminal 520 to the first terminal 520 through the Msg2 transmitted as a response to the Msg1. On the other hand, when the size of the fine TA value determined in the step S565 is within a predetermined reference error value, the first base station 510 may determine that fine adjustment of the uplink transmission timing of the terminal 520 is not required. When it is determined that fine adjustment of the uplink transmission timing of the first terminal 520 is not required, the base station 510 may set the fine TA value to 0 and deliver it to the first terminal 520 through the Msg2. Alternatively, when it is determined that fine adjustment of the uplink transmission timing of the first terminal 520 is not required, the base station 510 may transmit the msg2 without including the fine TA value in the Msg2.

The first terminal 520 may receive the Msg2 from the base station 510 (S570). The first terminal 520 may identify the fine TA value in the Msg2 received from the base station 510. The first terminal 520 may perform an uplink transmission timing readjustment operation based on the fine TA value identified through the Msg2 (S575). For example, when the fine TA value delivered from the base station 510 is a positive real number, the first terminal 520 may set the uplink transmission timing to advance by the fine TA value. When the fine TA value delivered from the base station 510 is a negative real number, the first terminal 520 may set the uplink transmission timing to be delayed by the fine TA value. When the TA value delivered from the base station 510 is 0, the first terminal 520 may terminate the uplink transmission timing readjustment operation without adjusting the uplink transmission timing.

On the other hand, when the Msg2 received from the base station 510 does not include the fine TA value, the first terminal 520 may terminate the uplink transmission timing readjustment operation without adjusting the uplink transmission timing. Alternatively, when the fine TA value is not included in the Msg2 received from the base station 510, the first terminal 520 may not perform the uplink transmission timing readjustment operation.

Based on the uplink transmission timing readjusted in the step S575, the first terminal 520 may transmit a message 3 (Msg3) according to the RACH procedure to the base station 510 (S580). The base station 510 may receive the Msg3 transmitted from the first terminal 520. The base station 510 may identify a timing at which the Msg3 is received from the first terminal 520. The base station 510 may determine a fine TA value for fine adjustment of the uplink signal transmission timing of the first terminal based on comparison between the timing of receiving the Msg3 from the first terminal 520 and the reception reference timing of the base station 510 (S585). The fine TA determination operation in the step S585 may be the same as or similar to the fine TA determination operation according to the step S565. The base station 510 may transmit a message 4 (Msg4) according to the RACH procedure to the first terminal 520 (S590). If the size of the fine TA value determined in the step S585 is within a predetermined reference error value, the base station 510 may determine that additional fine adjustment of the uplink transmission timing of the first terminal 520 is not required. When it is determined that additional fine adjustment of the uplink transmission timing of the first terminal 520 is not required, the base station 510 may set the fine TA value to 0 and deliver it to the first terminal 520 through the Msg4. Alternatively, when it is determined that additional fine adjustment of the uplink transmission timing of the first terminal 520 is not required, the base station 510 may transmit the Msg4 without including the fine TA value in the Msg4. The first terminal 520 may receive the Msg4 transmitted from the base station 510 (S590). As the first terminal 520 receives the Msg4 from the base station 510, the 4-step RACH procedure may be completed. When the fine TA value is included in the Msg4, the first terminal 520 may perform an uplink transmission timing readjustment operation based on the fine TA value included in the Msg4. On the other hand, when the fine TA value is not included in the Msg4 received from the base station 510, the first terminal 520 may terminate the uplink transmission timing readjustment operation without adjusting the uplink transmission timing. Alternatively, when the fine TA value is not included in Msg4 received from the base station 510, the first terminal 520 may not perform the uplink transmission timing readjustment operation. Thereafter, the first terminal 520 may transmit an uplink signal to the base station 510 based on the uplink transmission timing determined according to the steps S530 to S590.

FIG. 6 is a sequence chart illustrating a third exemplary embodiment of a timing control method in a wireless communication system.

Referring to FIG. 6, a communication system 600 may include one or more base stations (BSs) and one or more terminals (e.g., user equipments (UEs)). FIG. 6 shows a communication system including one base station and a plurality of terminals as an example. However, this is only an example for convenience of description, and exemplary embodiments of the present disclosure are not limited thereto. For example, the communication system 600 may be configured to include a plurality of base stations and/or a plurality of terminals.

The communication system 600 may include a base station 610 and a first terminal 620. Here, the base station 610 may be the same as or similar to the base station 510 described with reference to FIG. 5. The first terminal 620 may be the same as or similar to the first terminal 520 described with reference to FIG. 5. Hereinafter, in describing a third exemplary embodiment of a timing control method in a wireless communication system with reference to FIG. 6, content overlapping with that described with reference to FIG. 4 and/or FIG. 5 may be omitted.

The base station 610 and the first terminal 620 may obtain time information from a communication network or a predetermined system capable of obtaining time information (S630). Based on the time information obtained in the step S630, the base station 610 and the first terminal 620 may set or obtain a predetermined initial timing reference. The base station 610 and the first terminal 620 may share the same or similar initial timing reference.

The base station 610 may transmit a first downlink signal including first transmission time information to the first terminal 620 (S640). The first terminal 620 may receive the first downlink signal transmitted from the base station 610 (S640). The first terminal 620 may obtain the first transmission time information from the first downlink signal received from the base station 610. Meanwhile, the first terminal 620 may identify first reception time information, which is information on a timing (i.e., first reception timing) at which the first downlink signal is received. The first terminal 620 may determine an initial timing advance (TA) value based on the first transmission time information and the first reception time information for the first downlink signal (S650). The first terminal 620 may adjust an uplink transmission timing based on the initial TA value determined in the step S650 (S655). The operations of the base station 610 and the first terminal 620 according to the steps S630 to S655 may be the same as or similar to the operations of the base station 510 and the first terminal 520 according to the steps S530 to S555 described with reference to FIG. 5.

The first terminal 620 may perform a random access channel (RACH) procedure after adjusting the uplink transmission timing as in the step S655. The RACH procedure may consist of four steps (4-step) or two steps (2-step). Referring to FIG. 6, the first terminal 620 may transmit a message A (MsgA) for the 2-step RACH procedure to the base station 610 (S660). Here, the first terminal 620 may transmit the MsgA to the base station 610 based on the uplink transmission timing adjusted in the step S655 (S660). The base station 610 may receive the MsgA from the first terminal 620 (S660). The base station 610 may determine a fine TA value for the uplink signal transmission timing of the first terminal 620 based on comparison between the timing of receiving the MsgA from the first terminal 620 and the reception reference timing of the base station 610 (S665). The operation of determining the fine TA value according to the step S665 may be the same as or similar to the operation of determining the fine TA value according to operation S565 described with reference to FIG. 5. Upon receiving the MsgA from the first terminal 620, the base station 610 may transmit a message B (MsgB) to the first terminal 620 according to the RACH procedure (S670). Here, the base station 610 may allow the fine TA value determined in the step S665 to be included in the MsgB transmitted to the first terminal 620. On the other hand, when it is determined that fine adjustment of the uplink transmission timing of the first terminal 620 is not required, the base station 610 may set the fine TA value to 0 and deliver the fine TA value to the first terminal 620 through the MsgB. Alternatively, the base station 610 may transmit the MsgB without including the fine TA value in the MsgB.

The first terminal 620 may receive the MsgB from the base station 610 (S670). As the first terminal 6620 receives the MsgB from the base station 610, the 2-step RACH procedure may be completed. The first terminal 620 may perform an uplink transmission timing readjustment operation based on the fine TA value identified through the MsgB from the base station 610 (S675). The uplink transmission timing readjustment operation according to the step S675 may be the same as or similar to the uplink transmission timing readjustment operation according to the step S575 described with reference to FIG. 5. Alternatively, when the MsgB received from the base station 610 does not include the fine TA value, the first terminal 620 may not perform the uplink transmission timing readjustment operation.

Thereafter, the first terminal 620 may transmit an uplink signal to the base station 610 based on the uplink transmission timing determined according to the steps S630 to S675 (S685). The base station 610 may receive the uplink signal transmitted from the first terminal 620 (S685). The base station 610 may determine whether the uplink transmission timing of the first terminal 620 needs to be readjusted based on the uplink signal received from the first terminal 620. The base station 610 may determine a fine TA value based on the uplink signal received from the first terminal 620. The base station 610 may indicate or trigger the uplink transmission timing readjustment of the terminal 620 by delivering the determined fine TA value to the terminal 620 through a predetermined downlink signal.

According to an exemplary embodiment of the present disclosure, in a wireless communication system, a terminal may determine an initial TA value by comparing a transmission timing of a downlink signal received from a base station, which is included in the downlink signal, and a reception timing at which the terminal receives the downlink signal. The terminal may adjust an uplink transmission timing based on the determined initial TA value. The base station may inform the terminal of a fine TA value determined based on an uplink signal transmitted by the terminal based on the adjusted uplink transmission timing. The terminal may adjust the uplink transmission timing based on the fine TA value obtained from the base station. Through this, uplink transmission timing control for each terminal may be performed without a large expansion of a TA window or a large increase in control signal overhead in a wireless network environment having a large transmission delay.

However, the effects that can be achieved by the method and apparatus for timing control in the wireless communication system according to the exemplary embodiments of the present disclosure are not limited to those mentioned above, and other effects not mentioned may be clearly understood by those of ordinary skill in the art to which the present disclosure belongs from the configurations described in the present disclosure.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. A timing control method performed by a terminal included in a communication network, the timing control method comprising:
configuring an initial timing reference based on time information obtained from the communication network;
receiving information indicating a determination scheme of a first timing advance (TA) value from a base station;
receiving a first downlink (DL) signal from the base station, the first DL signal including information on a first transmission time that is a timing when the first DL signal is transmitted by the base station and first additional information including a transmission delay between the base station and a core network;
obtaining the information on the first transmission time based on the first DL signal;
obtaining information on a first reception time that is a timing when the first DL signal is received by the terminal based on the first DL signal and the initial timing reference configured based on the time information;
identifying a first difference value corresponding to a difference between the first reception time and the first transmission time;
calculating a first reference value based on the transmission delay between the base station and the core network;
determining the first TA value based on the identified first difference value and the calculated first reference value when the determination scheme indicated by the base station is a second determination scheme; and
adjusting an uplink (UL) transmission timing for the base station based on the first TA value,
wherein the first transmission time is identified by the base station based on the time information obtained from the communication network, and the first TA value is determined based on the identified first difference value without considering the calculated first reference value when the determination scheme indicated by the base station is a first determination scheme.

2. The timing control method according to claim 1, further comprising:
transmitting a first UL signal to the base station based on the UL transmission timing adjusted through the adjusting;
receiving a second DL signal transmitted by the base station as a response to the first UL signal;
performing readjustment on the UL transmission timing based on a second TA value when the second DL signal includes information on the second TA value; and
transmitting a second UL signal to the base station based on the readjusted UL transmission timing.

3. The timing control method according to claim 2, wherein the first UL signal is a message 1 (Msg1) according to a 4-step random access channel (RACH) procedure, the second DL signal is a message 2 (Msg2) according to the 4-step RACH procedure, and the second UL signal is a message 3 (Msg3) according to the 4-step RACH procedure.

4. The timing control method according to claim 2, wherein the first UL signal is a message A (MsgA) according to a 2-step RACH procedure, and the second DL signal is a message B (MsgB) according to the 2-step RACH procedure.

5. A timing control method performed by a base station included in a communication network, the timing control method comprising:
configuring an initial timing reference based on time information obtained from the communication network;
transmitting information indicating a determination scheme of a first timing advance (TA) value to a terminal;
transmitting a first downlink (DL) signal including information on a first transmission time and first additional information to the terminal included in the communication network, the first transmission time being a timing when the first DL signal is transmitted by the station identified based on the initial timing reference, and the first additional information including a transmission delay between the base station and a core network;
receiving, from the terminal, a first uplink (UL) signal transmitted based on an uplink (UL) transmission timing adjusted based on the first TA value; and
determining a second TA value for readjustment of the UL transmission timing of the terminal based on the first UL signal,
wherein the first TA value is determined by the terminal based on a first difference value and a first reference value when the determination scheme indicated by the base station is a second determination scheme, the first TA value is determined by the terminal based on the first difference value without considering the first reference value when the determination scheme indicated by the base station is a first determination scheme, the first difference value corresponds to a difference between the first transmission time and a first reception time that is a timing when the first DL signal is received by the terminal, the first reception time is identified by the terminal based on the time information obtained from the communication network, and the first reference value is calculated based on the transmission delay between the base station and the core network.

6. The timing control method according to claim 5, wherein the determining of the second TA value comprises:
identifying a second difference value corresponding to a difference between a reception timing when the first UL signal is received by the base station and a reception reference timing predetermined at the base station; and
determining the second TA value based on the second difference value.

7. The timing control method according to claim 6, further comprising:
comparing a size of the second TA value with a predetermined reference error value; and
when the size of the second TA value is equal to or greater than the predetermined reference error value, transmitting a second DL signal including information on the determined second TA value to the terminal.

8. The timing control method according to claim 6, further comprising:
comparing a size of the second TA value with a predetermined reference error value; and when the size of the second TA value is less than the predetermined reference error value, determining that readjustment of the UL transmission timing is not required for the terminal.

9. The timing control method according to claim 5, wherein the first UL signal is a message 1 (Msg1) or a message A (MsgA) according to a random access channel (RACH) procedure.

10. A terminal included in a communication network, the terminal comprising:
- a processor;
- a memory electronically communicating with the processor; and
- instructions stored in the memory,
- wherein when executed by the processor, the instructions cause the terminal to:
- configure an initial timing reference based on time information obtained from the communication network;
- receive information indicating a determination scheme of a first timing advance (TA) value from a base station;
- receive a first downlink (DL) signal from the base station, the first DL signal including information on a first transmission time that is a timing when the first DL signal is transmitted by the base station and first additional information including a transmission delay between the base station and a core network;
- obtain the information on the first transmission time based on the first DL signal;
- obtain information on a first reception time that is a timing when the first DL signal is received by the terminal based on the first DL signal and the initial timing reference configured based on the time information;
- identify a first difference value corresponding to a difference between the first reception time and the first transmission time;
- calculate a first reference value based on the transmission delay between the base station and the core network;
- determine the first TA value based on the identified first difference value and the calculated first reference value when the determination scheme indicated by the base station is a second determination scheme; and
- adjust an uplink (UL) transmission timing for the base station based on the first TA value,
- wherein the first transmission time is identified by the base station based on the time information obtained from the communication network, and the first TA value is determined based on the identified first difference value without considering the calculated first reference value when the determination scheme indicated by the base station is a first determination scheme.

11. The terminal according to claim 10, wherein the instructions further cause the terminal to:
- transmit a first UL signal to the base station based on the UL transmission timing adjusted through the adjusting;
- receive a second DL signal transmitted by the base station as a response to the first UL signal;
- perform readjustment on the UL transmission timing based on a second TA value when the second DL signal includes information on the second TA value; and
- transmit a second UL signal to the base station based on the readjusted UL transmission timing.

12. The terminal according to claim 11, wherein the first UL signal is a message 1 (Msg1) or a message A (MsgA) according to a random access channel (RACH) procedure, and the second DL signal is a message 2 (Msg2) or a message B (MsgB) according to the RACH procedure.

* * * * *